No. 778,560. PATENTED DEC. 27, 1904.
A. H. WHITING.
SUPPORTING AND SHIFTING BATTERIES FOR AUTOMOBILES.
APPLICATION FILED SEPT. 19, 1903.
2 SHEETS—SHEET 1.
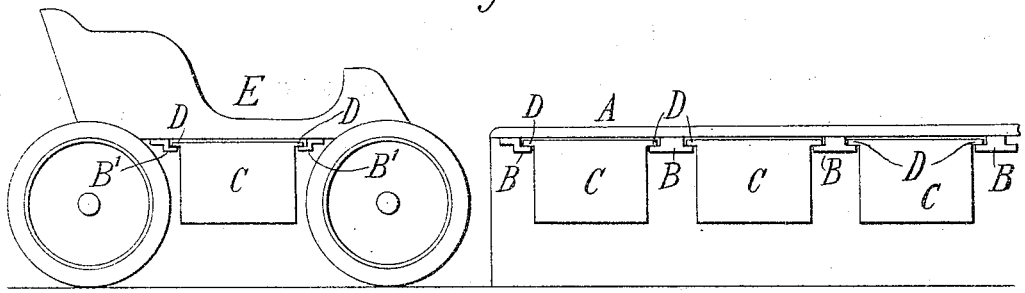
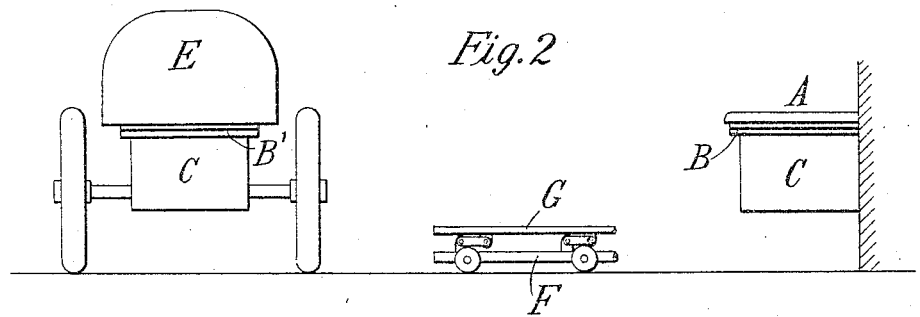
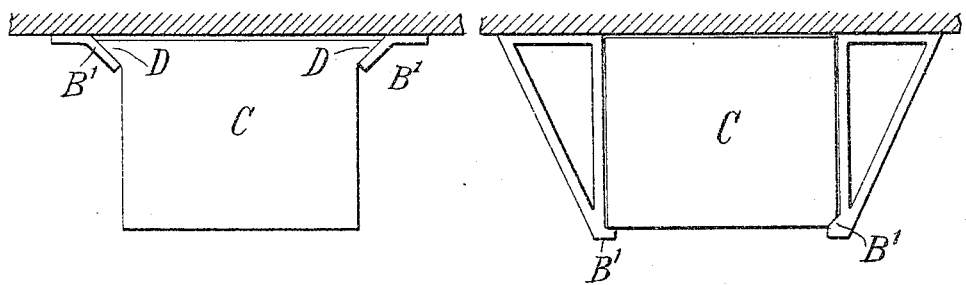
Witnesses:
Gustave R Thompson
Wm B Kershaw
Allan H Whiting
Inventor
Mauro Cameron Lewis
by Attys

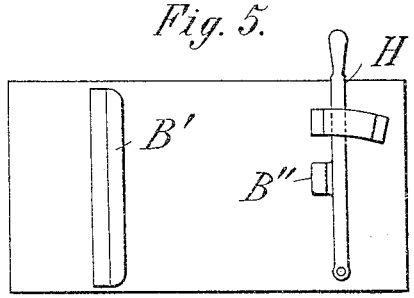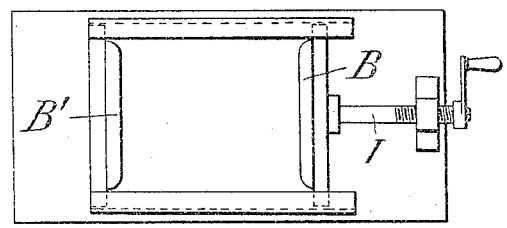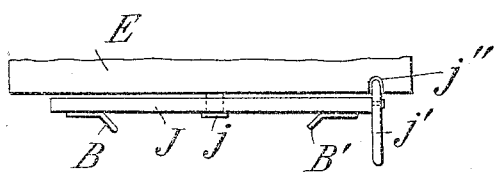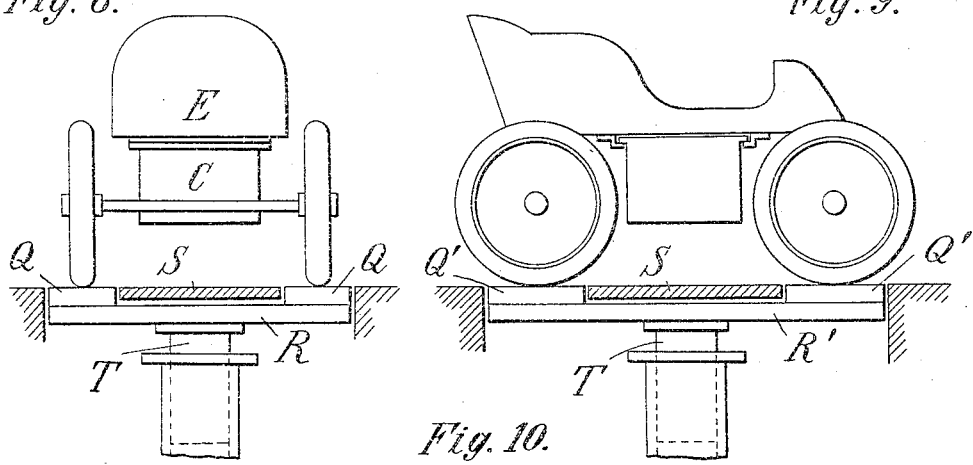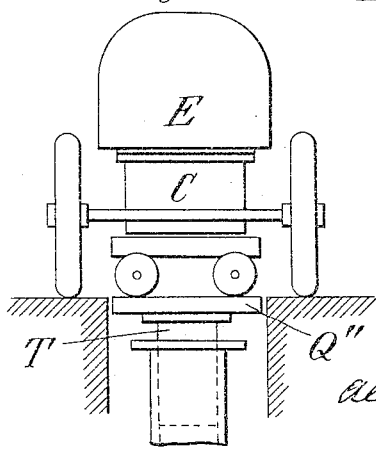

No. 778,560.                                    Patented December 27, 1904.

UNITED STATES PATENT OFFICE.

ALLAN H. WHITING, OF ORANGE, NEW JERSEY.

SUPPORTING AND SHIFTING BATTERY FOR AUTOMOBILES.

SPECIFICATION forming part of Letters Patent No. 778,560, dated December 27, 1904.

Application filed September 19, 1903. Serial No. 173,877.

*To all whom it may concern:*

Be it known that I, ALLAN H. WHITING, of Orange, Essex county, New Jersey, (post-office address Edison Laboratory, Orange, New Jersey,) have invented a new and useful Improvement in Supporting and Shifting Batteries for Automobiles, which invention is fully set forth in the following specification.

My invention relates to a system for shifting batteries for electric vehicles—that is, for removing discharged storage batteries and substituting charged batteries, particularly with heavy automobile-trucks. Heretofore the battery-cases have either been shifted by hand (being hauled in and out of the bed of the vehicle by main strength) or complicated hydraulic mechanism has been employed for heavier outfits, in either case entailing considerable wear and tear on the parts.

My invention consists in the manner of supporting the battery-case in racks in the station-house, also beneath the vehicle, and, further, in certain details of construction and arrangement to be hereinafter pointed out.

In the drawings, Figure 1 shows a side view of an automobile and a front view of a battery-rack in a central station-house. Fig. 2 shows an end view of the automobile and of the battery-rack and a side view of a shifting-truck. Figs. 3 and 4 are side views of details of modifications. Figs. 5 and 6 are bottom views of still further modifications. Fig. 7 is a side view of a detail of another modification. Fig. 8 is an end view, Fig. 9 is a side view, and Fig. 10 is an end view, of further modifications, being shown partly in section.

In the station-house are racks A A, Figs. 1 and 2, beneath which is a series of parallel supports B B, each pair of which sustains a battery-case C, as by means of flanges D D, thereon.

E represents an automobile vehicle, beneath which a battery-case is similarly supported, so that the battery-cases may slide horizontally in and out of the supports.

F represents a truck with an elevating-platform G of any convenient form. The truck F when its platform is lowered will enter freely beneath the cases C on the rack and on the vehicle, the cases occupying about the same level in either position.

In operation the truck F is run under a discharged battery-case C of vehicle E. Platform G is then raised slightly to disengage flanges D D of the case from supports B' B' of the vehicle. The truck is then run under a pair of supports B B of the rack, so that the latter engage the flanges D D. Platform G is then lowered to leave the case suspended from the rack, and in similar manner a fresh battery-case C is taken from the rack and shifted into place beneath the vehicle. This is the general plan of my system, and I shall next describe the details and modifications.

The battery case or box C is suspended beneath the vehicle E, either directly from the frame of the vehicle-body or from the reaches or other fixed portion of the running-gear. This may be accomplished in a variety of ways, which applies likewise to the racks A. I may employ two parallel angle-irons B' in connection with the corresponding flanges D upon the upper sides of the battery-case C, Fig. 3, or similar ledges B' may be employed upon depending brackets for engaging the bottom of the battery-case C, Fig. 4. Again, instead of having two parallel supports B', I may employ one such angle-iron or ledge, with a single (short) support opposite, as B'', Fig. 5. This single support B'' may sometimes be mounted upon a lever H for adjustment to and from the opposite ledge. Similarly when two angle-irons B are employed one of them may be adjusted as by means of a feed-screw I, Fig. 6. Still another construction consists of an inverted turn-table J, supported beneath the automobile upon a stout pivot *j* and provided with some locking means for holding it in the desired position—as, for instance, a lever *j'*, whose inner end is adapted to engage in suitable notches *j''*, Fig. 7. From the lower side of this turn-table J suitable ledges or angle-irons may be employed, as already described. The object of these various modifications is to make provision for carrying battery-cases of different sizes and for convenience in shifting and removing the battery-case. Preferably the ledges B' and flanges D will be beveled, as in Fig. 3, and flaring at the ends, Figs. 5 and 6.

The battery-case will be inserted and removed by lateral movement parallel with the supporting angle-irons and will be held in place by any suitable locking device. (Not shown.)

The shifting of the battery-cases may be accomplished by several different means. For instance, I may employ the small truck F, provided with an elevating-platform G. Only a slight amount of vertical travel is necessary—merely sufficient to raise the battery-case a very slight distance, sufficient to clear the supporting-ledges of the automobile. Any well-known form of elevating-platform truck may be employed for this purpose.

Instead of employing the elevating-platform truck I may make use of an elevating-platform upon which the automobile is run, in which case the platform may be arranged in different ways, the idea being to have a permanent floor beneath the central portion of the automobile where the battery is to be located. I may therefore employ an elevator system comprising two parallel strips or tracks Q, Fig. 8, each adapted for receiving and lifting the two wheels on the same side of the vehicle, the strips Q being connected by the cross-beams R beneath the intermediate permanent floor S, or each of two parallel platforms Q', Fig. 9, may be arranged to receive and lift one of them the front wheels and the other the rear wheels, the two platforms being similarly connected by two cross-beams R', or the elevating-platform Q" may be located beneath the battery-case for lifting an ordinary small truck, Fig. 10. In any of these three cases some suitable lifting means, as hydraulic ram T, will be employed.

The manner of shifting batteries will now be obvious. A vehicle containing a discharged battery is run into the station. An empty shifting-truck is run underneath the bottom of the battery-case C. Then either the truck-platform is elevated to lift the battery-case slightly in order to disengage it from the automobile or the platforms Q (or Q') are lowered for the same purpose or the platform Q" raised. Then, the battery-wires having been disconnected from the vehicle-motor and the locking device being opened, the shifting-truck is run out to one side. Next a similar shifting-truck containing a charged battery is run into place beneath the vehicle (or a single truck may be sufficiently long to carry off the empty battery while presenting a fresh one) and the case is properly inserted, and, finally, the locking devices are made fast, the battery-wires are connected to the vehicle-motor, the shifting-truck is removed, and the automobile is propelled on its journey.

My invention is not limited to the precise details of construction and arrangement which I have disclosed, as they are given merely for purpose of illustration, and parts of my invention may be employed to the exclusion of other portions without departing from the spirit of the invention. The spirit of my invention consists in supporting the battery-casing beneath the vehicle, so that it may be emplaced and removed by a lateral movement in connection with a very slight vertical travel, or the spirit of the invention may be said to consist in so mounting the battery-case that its bottom is exposed to be acted upon by lifting devices and raised clear of its supports, after which the case is free to be shifted out sidewise, the first of which is accomplished by having two oppositely-disposed supports with a clearance-space between them and the second by having these supports furnish a continuous channel-way open at either end.

I do not herein claim the manner of shifting the battery-cases, since that forms the subject-matter of my pending application, filed June 3, 1904, bearing Serial No. 211,050.

Having thus described my invention, I claim—

1. In combination with an automobile, a support for suspending a battery-case beneath the same, said support consisting of a ledge or angle-iron providing a channel-way for receiving the corresponding part of the battery-case, and opposite the said ledge a second adjustable support for receiving its corresponding portion of said battery-case.

2. The combination with an automobile and an inverted turn-table beneath the same.

3. The combination with an automobile and an inverted turn-table beneath the same and supports carried by said turn-table for engaging a battery-case.

4. A depending support for a storage battery consisting of a bracket engaging each side of the storage-battery case, one of said brackets providing a single point of support.

5. A depending support for a storage battery, comprising an inverted turn-table, and two brackets beneath the same for engaging the battery-case, one of said brackets being adjustable to and from the other and providing a single point of support.

In testimony whereof I have signed this specification in the presence of two subscribing witnesses.

ALLAN H. WHITING.

Witnesses:
C. A. L. MASSIE,
RALPH L. SCOTT.